US009126593B2

(12) United States Patent
Saito

(10) Patent No.: US 9,126,593 B2
(45) Date of Patent: Sep. 8, 2015

(54) VIBRATION DAMPING CONTROL DEVICE

(75) Inventor: Takashi Saito, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/119,580

(22) PCT Filed: May 26, 2011

(86) PCT No.: PCT/JP2011/062126
§ 371 (c)(1),
(2), (4) Date: Nov. 22, 2013

(87) PCT Pub. No.: WO2012/160701
PCT Pub. Date: Nov. 29, 2012

(65) Prior Publication Data
US 2014/0088792 A1 Mar. 27, 2014

(51) Int. Cl.
B60W 30/02 (2012.01)
F16F 15/00 (2006.01)
F02D 29/02 (2006.01)

(52) U.S. Cl.
CPC ............ B60W 30/025 (2013.01); F16F 15/002 (2013.01); F02D 29/02 (2013.01)

(58) Field of Classification Search
CPC ...... B60W 30/025; F02D 29/02; F16F 15/002
USPC .............................................. 701/1
See application file for complete search history.

(56) References Cited

U.S. PATENT DOCUMENTS 5,484,353 A * 1/1996 Lux et al. ................... 477/169
5,994,859 A * 11/1999 Deng et al. ................. 318/432
6,079,258 A * 6/2000 List et al. ................ 73/118.01

(Continued)

FOREIGN PATENT DOCUMENTS

JP 62091641 A * 4/1987 .............. F02D 41/22
JP 62091642 A * 4/1987 .............. F02D 41/22

(Continued)

OTHER PUBLICATIONS

FEV Group, "Optimizing Vehicle NVH Characteristics for Driveline Integration", Jun. 4, 2007, 15 pages, downloaded from http://www.fev.com/fileadmin/user_upload/Media/TechnicalPublications/NVH/Optimizing_Vehicle_NVH_Characteristics_for_Driveline_Integration.pdf.*

(Continued)

Primary Examiner — Behrang Badii
Assistant Examiner — David Testardi
(74) Attorney, Agent, or Firm — Gifford, Krass, Sprinkle, Anderson & Citkowski, P.C.

(57) ABSTRACT

In order to properly perform vibration damping control in a vehicle 1 in which vibration occurs due to driving characteristics, a vibration damping control device 10 performs sprung vibration damping control of suppressing sprung vibration generated in the vehicle 1, by control of the torque that is generated in wheels 5 of the vehicle 1, with this vibration damping control device 10 performing vibration damping control suppression control of stopping sprung vibration damping control, or reducing a control amount of sprung vibration damping control, on the basis of engine speed and engine torque of an engine 14 that is a power source of the vehicle 1 during travel. As a result, it becomes possible to prevent vibration damping control from being brought to an inappropriate state, due to a travel state of substantial vibration, during vibration damping control.

3 Claims, 11 Drawing Sheets

(56) References Cited

U.S. PATENT DOCUMENTS

| | | | |
|---|---|---|---|
| 6,161,530 A * | 12/2000 | Kakizaki et al. | 123/674 |
| 6,565,479 B2 * | 5/2003 | Fattic et al. | 477/3 |
| 8,892,280 B2 * | 11/2014 | Kinoshita et al. | 701/22 |
| 2002/0058565 A1 * | 5/2002 | Yamamoto et al. | 477/5 |
| 2010/0228465 A1 * | 9/2010 | Itabashi | 701/104 |
| 2011/0213527 A1 * | 9/2011 | Itabashi et al. | 701/37 |
| 2012/0059544 A1 * | 3/2012 | Kinoshita et al. | 701/22 |
| 2012/0101691 A1 * | 4/2012 | Otsuka et al. | 701/48 |

FOREIGN PATENT DOCUMENTS

| | | | | |
|---|---|---|---|---|
| JP | 2009113517 A * | 5/2009 | | |
| JP | 2009274601 A * | 11/2009 | | |
| JP | 2010-106817 A | 5/2010 | | |
| JP | 2010-179856 A | 8/2010 | | |
| JP | 2010-285144 A | 12/2010 | | |
| JP | 2011-017303 A | 1/2011 | | |
| WO | WO 2010049769 A1 * | 5/2010 | | B60W 30/02 |
| WO | WO 2011004228 A2 * | 1/2011 | | |

OTHER PUBLICATIONS

GM Techlink-post, "Chuggle, Surge or Shudder", Dec. 1, 2007, 2 pages, downloaded from http://www.archivedsites.com/techlink/2007/12/chuggle-surge-or-shudder.html.*

* cited by examiner

VIBRATION DAMPING CONTROL DEVICE

TECHNICAL FIELD

The invention relates to a vibration damping control device.

BACKGROUND ART

During travel of a vehicle, the attitude of the latter changes on account of so-called sprung vibration, which denotes vibration that occurs closer to the vehicle body than the suspension of the vehicle, and that arises on account of the driving operation by the driver or on account of disturbances during travel of the vehicle. Therefore, some conventional vehicles aim at reducing such sprung vibration. In a vibration damping control device disclosed in Patent Document 1, for instance, a control instruction at the time of executing of vibration damping control of suppressing sprung vibration is outputted in response to a plurality of types of control instructions, and an anomaly in vibration damping control is determined to have occurred or not on the basis of the plurality of control instructions, such that vibration damping control is forbidden in the case where an anomaly in vibration damping control is determined to have occurred. As a result, this allows performing vibration damping control only when sprung vibration can be suppressed effectively.

RELATED ART DOCUMENTS

Patent Documents

Patent Document 1: Japanese Patent Application Publication No. 2010-106817

SUMMARY OF THE INVENTION

Problems to be Solved by the Invention

Depending on the vehicle, noise and vibration increase at specific operating regions. In some instances, sprung vibration damping control may fail to be carried out properly, on account of vibration, if sprung vibration damping control is performed at an operating region of increasing noise and vibration. Specifically, noise and vibration generated during travel of the vehicle include, for instance, vibration from gears of a drive system, caused by gear rattling. Vibration and the like derived from gear rattling occurs readily in instances where the driving force crosses 0 [N]. In sprung vibration damping control, a control amount is outputted in the form of a sinusoidal wave. The number of times that the driving force crosses 0 [N] increases thus in a case where sprung vibration damping control is performed. Accordingly, noise and vibration that are generated may increase readily, depending on the characteristics of the vehicle, if sprung vibration damping control is performed in a vehicle where noise and vibration increase at a specific operating region, so that execution of sprung vibration damping control may result in an increase in superfluous vibration. Therefore, it has been very difficult to properly perform sprung vibration damping control in a vehicle having such characteristics.

In the light of the above, it is an object of the invention to provide a vibration damping control device that allows performing vibration damping control properly in a vehicle in which vibration occurs due to operating characteristics.

Means for Solving the Problems

In order to solve the above problems and attain the above goal, a vibration damping control device according to the invention is a vibration damping control device performing sprung vibration damping control of suppressing sprung vibration generated in a vehicle, by control of torque generated in wheels of the vehicle, wherein vibration damping control suppression control of stopping the sprung vibration damping control or reducing a control amount of the sprung vibration damping control is performed on the basis of engine speed and engine torque of an engine that is a power source of the vehicle during travel.

Preferably, the vibration damping control device is provided with a control determination unit that determines whether or not to perform the vibration damping control suppression control, and with a noise vibration (NV) worsening region determination unit that determines, on the basis of the engine speed and the engine torque, whether or not a travel state of the vehicle is in an NV worsening region, which is a region at which vibration in the vehicle increases, wherein the control determination unit determines that the vibration damping control suppression control is to be performed when the NV worsening region determination unit determines that the travel state of the vehicle is in the NV worsening region.

In order to solve the above problems and attain the above goal, a vibration damping control device according to the invention is a vibration damping control device performing sprung vibration damping control, being control of suppressing sprung vibration generated in a vehicle, by control of torque generated in wheels of the vehicle, wherein a determination is made on whether or not the travel state of the vehicle is in an NV worsening region, which is a region at which vibration in the vehicle increases, on the basis of an operating state of an engine that is a power source of the vehicle during travel, and vibration damping control suppression control of stopping the sprung vibration damping control or reducing a control amount of the sprung vibration damping control is performed on the basis of a result of the determination on whether or not the travel state of the vehicle is in the NV worsening region.

Effect of the Invention

The vibration damping control device according to the invention elicits the effect of allowing performing vibration damping control properly in a vehicle in which vibration occurs due to operating characteristics.

MODE FOR CARRYING OUT THE INVENTION

Embodiments of the vibration damping control device according to the invention will be explained in detail next with reference to accompanying drawings. However, the invention is not limited to these embodiments. Constituent elements in the embodiments below include alternative elements that could be easily conceived of by a person skilled in the art, as well as constituent elements that are substantially identical.

[Embodiment 1]

Figure 1:
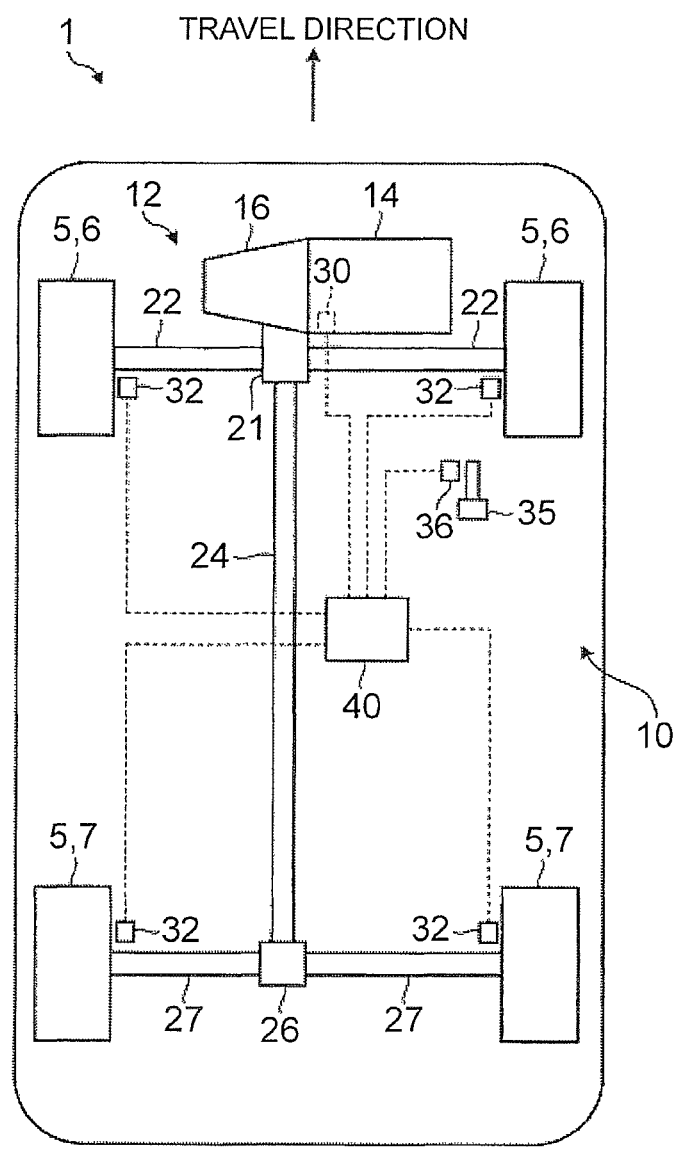
FIG. 1 is a schematic diagram of a vehicle provided with a vibration damping control device according to Embodiment 1 of the invention.

FIG. 1 is a schematic diagram of a vehicle equipped with the vibration damping control device according to Embodiment 1 of the invention. In the explanation hereafter, frontwards will refer to the direction of advance of a vehicle 1 during ordinary travel, and rearwards will refer to the opposite direction to the travel direction. Sprung vibration in the explanation below refers to vibration that occurs in the vehicle body, by way of a suspension, and that is inputted to the wheels of the vehicle from the road surface, for instance vibration the frequency component whereof ranges from 1 to 4 Hz, and more specifically is about 1.5 Hz. Sprung vibration in the vehicle includes components in the pitch direction and in the bounce direction (vertical direction) of the vehicle. As used herein, the term sprung vibration damping refers to suppression of sprung vibration in the vehicle.

The vehicle 1 illustrated in FIG. 1 is provided with a vehicle vibration damping control device 10 according to Embodiment 1. The vehicle 1 is equipped with an engine 14, which is an internal combustion engine, as a power source, such that the vehicle 1 can travel by virtue of power from the by the engine 14. An automatic transmission 16, as an example of a transmission, is connected to the engine 14. Power generated in the engine 14 can thus be transmitted to the automatic transmission 16. A front wheel-side differential device 21 that distributes power transmitted by the automatic transmission 16 to left and right front wheels 6 is connected to the automatic transmission 16. Power that is distributed by the front wheel-side differential device 21 is transmitted to the front wheels 6 by way of a front wheel-side drive shaft 22 that is coupled to the front wheels 6.

A propeller shaft 24 that transmits to the rear wheel 7 side power that is transmitted by the automatic transmission 16 is connected to the front wheel-side differential device 21, such that power transmitted by the automatic transmission 16 is transmitted, by the propeller shaft 24, not only to the front wheels 6 but also to the rear wheel 7 side. The propeller shaft 24 is connected to a rear wheel-side differential device 26 that distributes power to the left and right rear wheels 7, such that power distributed by the rear wheel-side differential device 26 is transmitted to the rear wheels 7 by way of a rear wheel-side drive shaft 27 that is coupled to the rear wheels 7.

Power generated by the engine 14 can be thus transmitted to the front wheels 6 and the rear wheels 7, and a driving force can be generated in each of the wheels 5. That is, the vehicle 1 is provided in the form of a four-wheel drive vehicle that travels by virtue of driving forces generated in both the front wheels 6 and the rear wheels 7. Devices such as the automatic transmission 16 and the engine 14 that allow generating driving force in the wheels 5 are provided herein as a driving device 12.

The vehicle 1 is provided with an accelerator pedal 35 that is operated by the driver, and with an accelerator depression amount sensor 36 capable of detecting a depression amount of the accelerator pedal 35. The driving device 12 is provided in such a way so as to be capable of generating driving force in accordance with the depression amount of the accelerator pedal 35.

The driving device 12 thus provided is connected to an electronic control device 40 that is installed in the vehicle 1. The operation of the driving device 12 is controlled by the electronic control device 40. The electronic control device 40 is configured by having an arithmetic processing unit and a storage unit. Into the electronic control device 40 there are introduced signals that include, for instance, a signal that denotes engine speed Er, from a engine speed sensor 30 that detects engine speed during running of the engine 14, signals that denote a respective wheel speed Vwi (i=FL, FR, RL, RR), from a respective wheel speed sensor 32i (i=FL, FR, RL, RR) that detects the rotational speed of a respective wheel 5, as well as an accelerator depression amount θa that is detected by the accelerator depression amount sensor 36.

Figure 2:
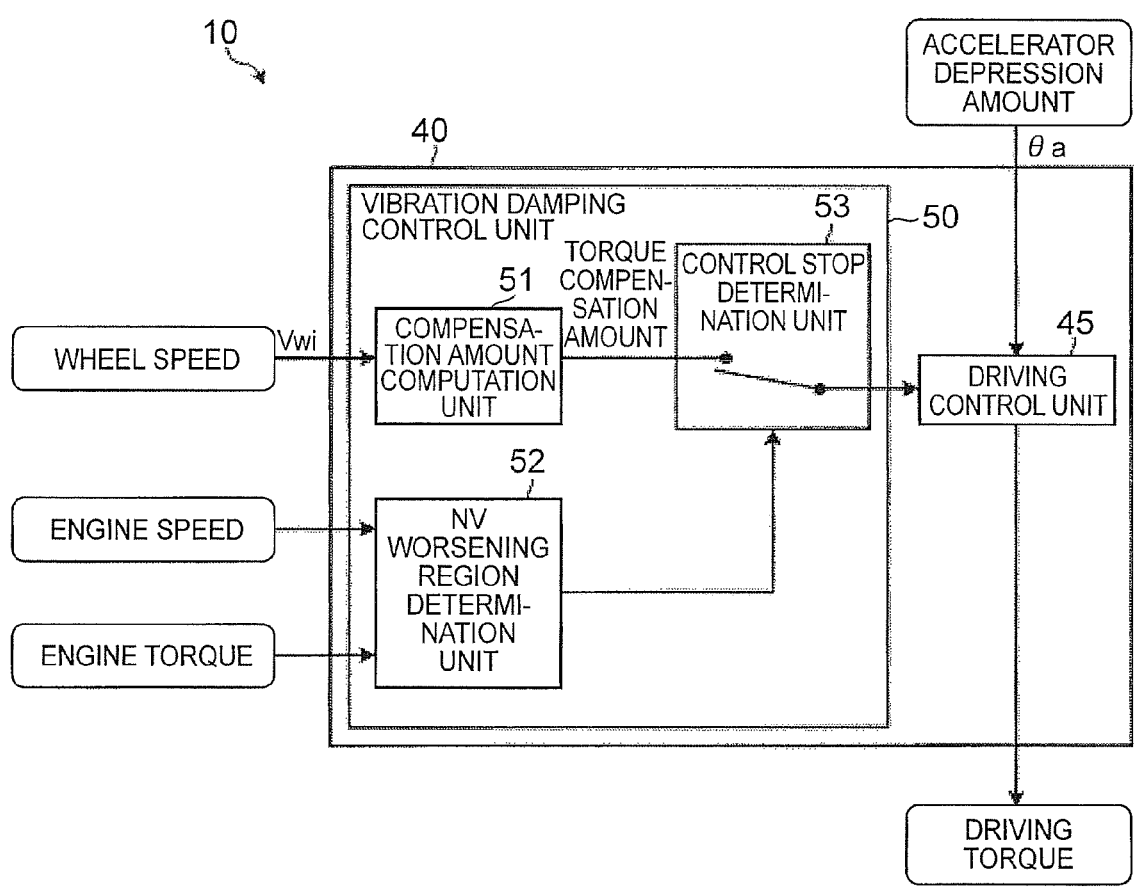
FIG. 2 is a configuration schematic diagram of an electronic control device illustrated in FIG. 1.

FIG. 2 is a configuration schematic diagram of the electronic control device illustrated in FIG. 1. As shown in FIG. 2, the electronic control device 40 has a driving control unit 45 that controls the operation of the driving device 12, and a vibration damping control unit 50 that performs vibration damping control, which is control of suppressing sprung vibration. The driving control unit 45 determines commands upon control of the driving force to be generated by the driving device 12, on the basis of a drive request by the driver, for instance the accelerator depression amount θa, and transmits this command to the driving device 12, to enable thereby control of the driving device 12.

The vibration damping control unit 50 has: a compensation amount computation unit 51 which, upon execution of vibration damping control, calculates a compensation amount that is a correction amount of driving torque for suppressing sprung vibration; an NV worsening region determination unit 52 that determines whether or not a travel state of the vehicle 1 is in an NV worsening region, being an operating region at which noise and vibration increase; and a control stop determination unit 53 that determines whether or not to stop vibration damping control. As a result, the vibration damping control unit 50 not only performs vibration damping control during travel of the vehicle 1, but also stops vibration damping control on the basis of the operating state of the vehicle 1.

In the vibration damping control unit 50 thus provided, electrical signals from the wheel speed sensors 32i are inputted to the compensation amount computation unit 51. The compensation amount computation unit 51 of the vibration damping control unit 50 calculates each wheel rotational speed $\omega i$ (i=FL, FR, RL, RR) on the basis of an electrical signal from each wheel speed Vwi that is inputted by a respective wheel speed sensor 32i, and multiplies the wheel rotational speed $\omega i$ by the radius r of the wheel, to calculate thereby an average value $r \cdot \omega$ of the wheel speed Vwi. The compensation amount computation unit 51 calculates a compensation amount of driving torque on the basis of the average value r·ω of the wheel speed Vwi thus calculated.

The NV worsening region determination unit 52 of the vibration damping control unit 50 acquires engine speed and engine torque. Herein, engine speed are acquired on the basis of an electrical signal from the engine speed sensor 30. Engine torque is estimated and acquired on the basis of, for instance, an electrical signal from the engine speed sensor 30, an electrical signal from an airflow sensor (not shown) that detects a intake air amount during running of the engine 14, and a fuel injection amount from a fuel injector (not shown) that is provided in the engine 14. The NV worsening region determination unit 52 acquires thus the engine speed and the engine torque, and determines whether or not the current travel state is in the NV worsening region, on the basis of the engine speed and the engine torque.

The control stop determination unit 53 of the vibration damping control unit 50 determines whether or not vibration damping control is to be performed, in accordance with the determination result of the NV worsening region determination unit 52. The compensation amount of driving torque as calculated by the compensation amount computation unit 51 is transmitted to the driving control unit 45 only in an instance where the control stop determination unit 53 determines that vibration damping control is to be performed.

On the basis of the compensation amount of driving torque transmitted by the vibration damping control unit 50, the driving control unit 45 corrects a driver-required torque, being a required torque to be generated by the wheels 5 in order to realize the travel state demanded by the driver, and determines the driving torque to be generated in the wheels 5. The driving control unit 45 controls the driving device 12, in such a way so as to generate the driving torque thus determined, to bring thereby the driving torque to a magnitude that enables suppression of sprung vibration, and execute thus vibration damping control.

In a case where the control stop determination unit 53 determines that vibration damping control is not to be performed, the vibration damping control unit 50 does not transmit, to the driving control unit 45, the compensation amount of driving torque as calculated by the compensation amount computation unit 51. Accordingly, the driving control unit 45 maintains the driver-required torque as the driving torque, and causes the driving device 12 to generate that driving torque. That is, the vibration damping control unit 50 performs vibration damping control suppression control of stopping vibration damping control, on the basis of the engine speed and the engine torque.

Figure 3:
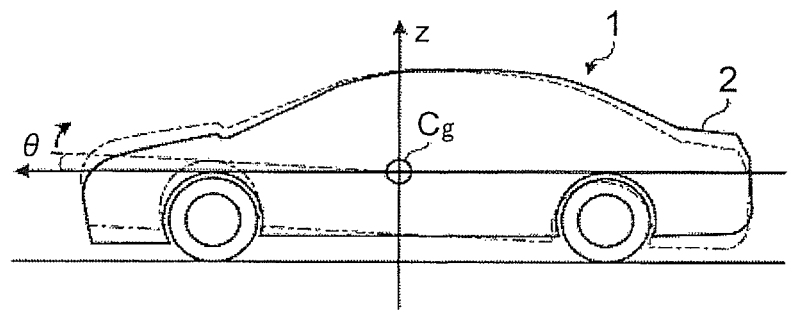
FIG. 3 is an explanatory diagram of a motion direction of a vehicle body.

An explanation follows next on motion at the time of sprung vibration, and on a suppression method thereof. FIG. 3 is an explanatory diagram of motion directions of a vehicle body. When wheel torque fluctuates through operation of the driving device 12 on the basis of a drive request by the driver, bounce vibration, which is vibration of the center of gravity Cg of the vehicle body 2 in a vertical direction (z direction), and pitch vibration, which is vibration in a pitch direction (θ direction) about the center of gravity of the vehicle body 2, may arise in the vehicle body 2, as illustrated in FIG. 3. When an external force or torque (disturbances) from the road surface acts on the wheels 5, during travel of the vehicle 1, such disturbances are transmitted to the vehicle 1, and may give rise to vibration in the vehicle body 2, in the bounce direction and the pitch direction.

Accordingly, the vibration damping control device 10 according to Embodiment 1 constructs a motion model of sprung vibration, including pitch and bounce, of the vehicle body 2; calculates, in the model, displacements z, θ of the vehicle body 2 at the time of input of a value resulting from converting the driver-required torque to wheel torque and of an estimated value of current wheel torque, and calculates as well the rates of change dz/dt and dθ/dt of the displacements; and the driving torque to be generated at the wheels 5 is adjusted, in the driving device 12, in such a manner that the state variables obtained from model converge to 0. In vibration damping control, thus, the driver-required torque is corrected in such a way so as to suppress sprung vibration.

Figure 4:
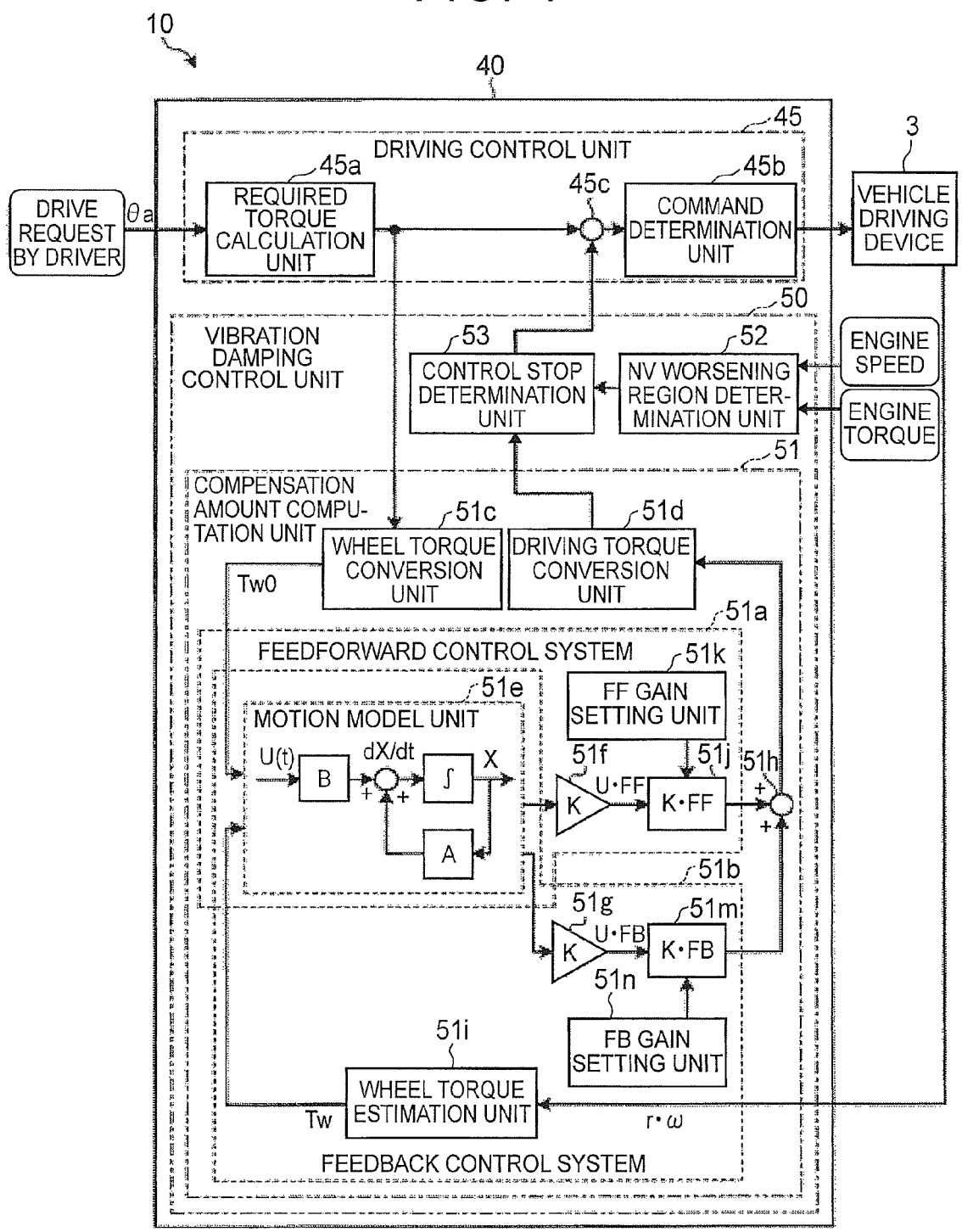
FIG. 4 is a block diagram illustrating a control configuration involved in driving force control.

FIG. 4 is a block diagram illustrating the control configuration involved in driving force control. In a case where vibration damping control is performed in the vibration damping control device 10 according to Embodiment 1, the various computations are executed in the electronic control device 40, but vibration damping control is performed by the driving control unit 45 and the vibration damping control unit 50. Among the foregoing, the driving control unit 45 converts the accelerator depression amount θa that is detected by the accelerator depression amount sensor 36, as a drive request of the driver, to driver-required torque, in a required torque calculation unit 45a, and a command determination unit 45b converts the resulting torque to a control command for the vehicle driving device 3, and transmits the control command to the vehicle driving device 3. As referred to herein, the vehicle driving device 3 encompasses not only the driving device 12, but also a device that can detect wheel speed, such as the wheel speed sensor 32, and is configured so as to be capable of receiving feedback (FB) of the travel state during travel of the vehicle 1.

The compensation amount computation unit 51 of the vibration damping control unit 50 is provided with a feedforward control system (hereafter, FF control system) 51a and a FB control system 51b. The compensation amount computation unit 51 is provided with a wheel torque conversion unit 51c that converts the driver-required torque to a required wheel torque Tw0 that is torque to be generated at the wheels 5, and a driving torque conversion unit 51d that converts a correction amount of the required wheel torque Tw0 to the units of driving torque of the vehicle driving device 3.

The FF control system 51a is provided with a motion model unit 51e of sprung vibration, an FF compensation amount calculation unit 51f, an FF correction unit 51j, and an FF gain setting unit 51k. The required wheel torque Tw0 converted at the wheel torque conversion unit 51c is inputted to the motion model unit 51e. The motion model unit 51e calculates a response of the state variables of the vehicle 1 for the inputted torque, and outputs the response to the FF compensation amount calculation unit 51f. The FF compensation amount calculation unit 51f calculates an FF-system compensation amount U·FF that is a correction amount of the required wheel torque Tw0 such that the state variables are caused to converge to a minimum, and that is a vibration damping control compensation amount in FF control. In the FF correction unit 51j, an FF control gain K·FF that is set at the FF gain setting unit 51k in accordance with the state of the vehicle 1 is multiplied by the FF-system compensation amount U·FF.

The FB control system 51b is provided with: a wheel torque estimation unit 51i that estimates the wheel torque estimated value Tw that is an estimated value of torque to be generated in the wheels 5; the motion model unit 51e that is shared with the FF control system 51a; an FB compensation amount calculation unit 51g; an FB correction unit 51m; and an FB gain setting unit 51n. In the FB control system 51b, the wheel torque estimated value Tw is calculated in the wheel torque estimation unit 51i on the basis of the average value r·ω of wheel speed, and a response of the state variables of the vehicle 1 is calculated, in the motion model unit 51e, using the wheel torque estimated value Tw as a disturbance input. The FB compensation amount calculation unit 51g calculates an FB-system compensation amount U·FB, which is a correction amount of the required wheel torque Tw0 such that the state variables are caused to converge to a minimum, and that is a vibration damping control compensation amount in FB control. The FB correction unit 51m multiplies an FB control gain K·FB that is set in the FB gain setting unit 51n in accordance with the state of the vehicle 1, by the FB-system compensation amount U·FB. In Embodiment 1, the motion model unit 51e is shared by the FF control system 51a and the FB control system 51b, but individual motion model units may be provided separately.

In the compensation amount computation unit 51 of the vibration damping control unit 50, an adder 51h adds the FF-system compensation amount U·FF and the FB-system compensation amount U·FB, to calculate a vibration damping torque. The vibration damping torque, which is a superimposed torque for vibration damping, can suppress sprung vibration by being superposed onto the driver-required torque. The vibration damping torque calculated in the adder 51h is converted, in the driving torque conversion unit 51d, to the units of required torque of the vehicle driving device 3, and is transmitted to an adder 45c of the driving control unit 45. The vibration damping torque thus calculated in the compensation amount computation unit 51 is transmitted to the adder 45c of the driving control unit 45 only if the control stop determination unit 53 has determined that vibration damping control is to be performed. In the adder 45c, the vibration damping torque is superposed through addition of the vibration damping torque that is transmitted by the vibration damping control unit 50 to the driver-required torque as calculated in the required torque calculation unit 45a.

In the driving control unit 45 and the vibration damping control unit 50, the driver-required torque is corrected on the basis of the vibration damping torque that is acquired on the basis of a mechanical motion model, so that, as a result, the driver-required torque is corrected to a value that allows generating a torque that is capable of suppressing sprung vibration in the vehicle 1, is converted to a control command in the command determination unit 45b, and the control command is transmitted thereafter to the vehicle driving device 3.

The principle of vibration damping control is explained next. In the vibration damping control device 10 according to Embodiment 1, as explained above, firstly there is assumed a mechanical motion model in the bounce direction and the pitch direction of the vehicle body 2, to configure equations of state of the state variables, in the bounce direction and the pitch direction, into which there are inputted the required wheel torque Tw0 and wheel torque estimated value Tw (disturbance). The input (torque value) such that the state variables in the bounce direction and the pitch direction are caused to converge to 0 is determined, on the basis of the equations of state, according to the optimal regulator theory. The driver-required torque is corrected on the basis of the obtained torque value.

Figure 5:
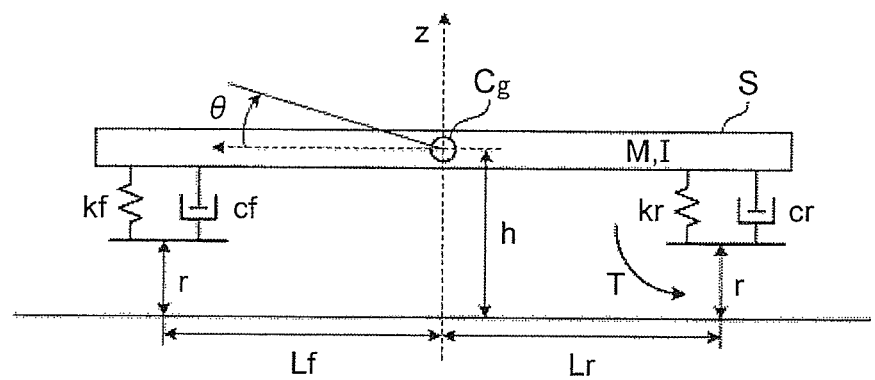
FIG. 5 is an explanatory diagram of a mechanical motion model in a bounce direction and a pitch direction, being an explanatory diagram of an instance where a sprung vibration model is utilized.

FIG. 5 is an explanatory diagram of a mechanical motion model in the bounce direction and the pitch direction, being an explanatory diagram of an instance where a sprung vibration model is utilized. The mechanical motion model of the vehicle body 2 in the bounce direction and the pitch direction (sprung vibration model of the vehicle body 2) postulates, for instance, that the vehicle body 2 is treated as a rigid body S of mass M and moment of inertia I, with the rigid body S being supported by a front wheel suspension having an elastic modulus kf and an attenuation rate cf, and a rear wheel suspension having an elastic modulus kr and an attenuation rate cr, as illustrated in FIG. 5. In this case, the motion equation of the center of gravity of vehicle body 2 in the bounce direction and the motion equation in the pitch direction are given by the set of Math. 1 below.

[Math. 1]

$$M\frac{d^2 z}{dt^2} = -kf(z + Lf \cdot \theta) - \tag{1a}$$
$$cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right)$$

$$I\frac{d^2 \theta}{dt^2} = -Lf\left\{kf(z + Lf \cdot \theta) + cf\left(\frac{dz}{dt} + Lf \cdot \frac{d\theta}{dt}\right)\right\} + \tag{1b}$$
$$Lr\left\{kr(z - Lr \cdot \theta) + cr\left(\frac{dz}{dt} - Lr \cdot \frac{d\theta}{dt}\right)\right\} + \frac{h}{r} \cdot T$$

In Expressions (1a) and (1b), Lf and Lr are respectively the distance from the center of gravity Cg to the front wheel axle and the rear wheel axle, r is the wheel radius, and h is the height of the center of gravity Cg from the road surface. In Expression (1a), the first and second terms are components of a force from the front wheel axle, and the third and fourth terms are components of a force from the rear wheel axle; in Expression (1b) the first term is a moment component of force from the front wheel axle, and the second term of the force from the rear wheel axle. The third term in Expression (1b) is a moment component of a force that is exerted, about the center of gravity of the vehicle body 2, by the wheel torque T (=Tw0+Tw) generated in the drive wheels.

Herein, Expressions (1a) and (1b) can be rewritten in the form of an equation of state (of a linear system), as in Expression (2a) below, by setting the displacements z, θ of the vehicle body 2 and the rates of change dz/dt, dθ/dt thereof, as a state variable vector X(t).

$$dX(t)/dt = A \cdot X(t) + B \cdot u(t) \tag{2a}$$

Herein, X(t), A, B are the matrices X(t), A, B below.

[Math. 2]
$$X(t) = \begin{pmatrix} z \\ dz/dt \\ \theta \\ d\theta/dt \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

The elements a1-a4 and b1-b4 in matrix A are given by arranging the coefficients of z, θ, dz/dt and dθ/dt in Expressions (1a) and (1b), to yield a1=−(kf+kr)/M, a2=−(cf+cr)/M, a3=−(kf·Lf−kr·Lr)/M, a4=−(cf·Lf−cr·Lr)/M, b1=−(Lf·kf−Lr·kr)/I, b2=−(Lf·cf−Lr·cr)/I, b3=−(Lf²·kf+Lr²·kr)/I and b4=−(Lf²·cf+Lr²·cr)/I. Further, u(t) is u(t)=T, and is the input of the system represented by the equation of state (2a). Therefore, the element p1 of matrix B is p1=h/(I·r), as per Expression (1b).

Substituting u(t)=−K·X(t) . . . (2b) in the equation of state (2a), then dX(t)/dt=(A−BK)·X(t) . . . (2c) is obtained in the equation of state (2a).

When solving the differential equation (2c) of the state variable vector X(t), through setting of the initial value $X_0(t)$ of X(t) to $X_0(t)$=(0,0,0,0) (which assumes no vibration before torque input), therefore, a torque value u(t) is determined that suppresses bounce and pitch vibration if there is determined a gain K such that the magnitude of X(t), i.e. the magnitude of the displacement in the bounce direction and the pitch direction, as well as the time rate of change thereof, are caused to converge to 0.

The gain K can be determined by relying on the so-called optimal regulator theory. According to that theory, it is conventional that X(t) stably converges in the equation of state (2a) when a value of a quadratic-form evaluation function $$J = \int (X^T Q X + u^T R u) dt \tag{3a}$$

(integration range from 0 to ∞) is a minimum, and that a matrix K such that the evaluation function J is minimized is given by $K = R^{-1} \cdot B^T \cdot P$. Herein, P is a solution of a Riccati equation ($-dP/dt = A^T P + PA + Q - PBR^{-1} B^T P$). The Riccati equation can be solved by resorting to any method available in the field of linear systems. The gain K is worked out as a result.

The evaluation function J as well as Q and R in the Riccati equation are a positive semi-definite symmetric matrix and positive definite symmetric matrices, respectively, that are arbitrarily set, and are weighting matrices of an evaluation function J that is determined by designer of the system. In the case of the motion model considered herein, for instance, when Q and R are set to

[Math. 3]
$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

and the norm (magnitude) of a specific component from among the components of the state vector, for example, dz/dt and dθ/dt in Expression (3a) is set to be larger than the norm of another component, for example, z and θ, the component the norm whereof is set to be larger exhibits a relatively more stable convergence. Transient characteristics are emphasized when the value of the Q component is increased, i.e. consumed energy is reduced when the value of the state vector converges rapidly to a stable value and the value of R increases. Herein, the gain K corresponding to the FF control system 51a and the gain K corresponding to FB control system 51b may be set to be dissimilar. For example, the gain K corresponding to the FF control system 51a may be set to a gain corresponding to the acceleration feeling of the driver, and the gain K corresponding to the FB control system 51b may be set to a gain corresponding to the tactile FB and responsiveness of the driver.

In actual vibration damping control, the state variable vector X(t) is calculated by solving the differential equation of Expression (2a) using the torque input value, in the motion model unit 51e, as illustrated in the block diagram of FIG. 4. Next, a value U(t), namely a FF-system compensation amount U·FF and an FB-system compensation amount U·FB, resulting from multiplying, in the FF compensation amount calculation unit 51f and the FB compensation amount calculation unit 51g, the gain K determined so that the state variable vector X(t) converges to 0 or a minimum value, as described above, are converted, in the driving torque conversion unit 51d, to the units of driving torque in the vehicle driving device 3, and the driver-required torque is corrected in the adder 45c.

The system represented by Expressions (1a) and (1b) is a resonance system, and the value of the state variable vector is substantially only a component of the natural frequency of the system for an arbitrary input. Therefore, a component of the natural frequency of the system, in the driver-required torque, namely a component that gives rise to sprung vibration typified by pitch/bounce vibration in the vehicle body 2, is corrected, and sprung vibration in the vehicle body 2 is suppressed, by resorting to a configuration wherein the driver-required torque is corrected by (a converted value of) U(t). That is, the component of natural frequency in the system, in the required torque command that is inputted to the vehicle driving device 3, becomes −U(t) alone, and vibration derived from Tw (disturbance) converges, when the component of the natural frequency of the system vanishes in the required torque given by the driver.

Figure 6:
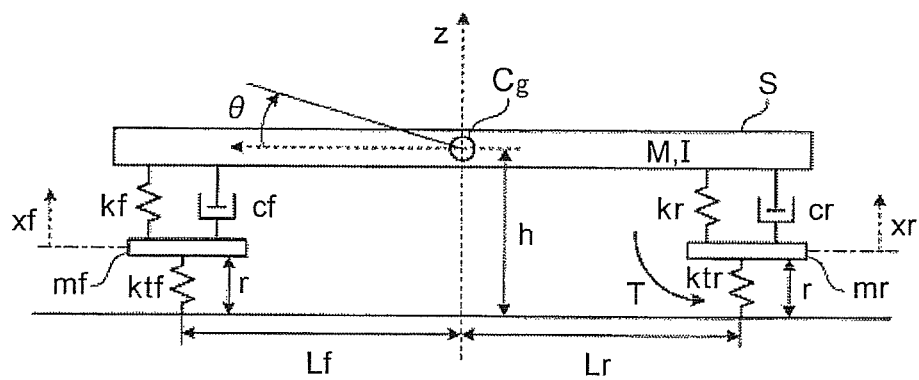
FIG. 6 is an explanatory diagram of a mechanical motion model in the bounce direction and the pitch direction, being an explanatory diagram of an instance where a sprung/unsprung vibration model is utilized.

FIG. 6 is an explanatory diagram of a mechanical motion model in the bounce direction and the pitch direction, being an explanatory diagram of an instance where a sprung/unsprung vibration model is utilized. A model that takes into account, in addition to the configuration of FIG. 5, also the spring elasticity of the tires of the front wheels 6 and the rear wheels 7 (sprung/unsprung vibration model of the vehicle body 2), as illustrated in FIG. 6, may be resorted to as the mechanical motion model of the vehicle body 2 in the bounce direction and the pitch direction. Assuming elastic moduli ktf and ktr for the tires of the front wheels 6 and the rear wheels 7, the motion equation of the center of gravity Cg of the vehicle body 2 in the bounce direction and the motion equation in the pitch direction is given by the sets of Math. 4, as can be grasped from FIG. 6.

[Math. 4]

$$M \frac{d^2 z}{dt^2} = -kf(z + Lf \cdot \theta - xf) - cf\left(\frac{dz}{dt} + Lf \cdot \frac{d\theta}{dt} - \frac{dxf}{dt}\right) - \tag{4a}$$
$$kf(z - Lf \cdot \theta - xr) - cr\left(\frac{dz}{dt} - Lr \cdot \frac{d\theta}{dt} - \frac{dxr}{dt}\right)$$

$$I \frac{d^2 \theta}{dt^2} = -Lf\left\{kf(z + Lf \cdot \theta - xf) + cf\left(\frac{dz}{dt} + Lf \cdot \frac{d\theta}{dt} - \frac{dxf}{dt}\right)\right\} + \tag{4b}$$
$$Lr\left\{kr(z - Lr \cdot \theta - xr) + cr\left(\frac{dz}{dt} - Lr \cdot \frac{d\theta}{dt} - \frac{dxr}{dt}\right)\right\} + \frac{h}{r} \cdot T$$

$$mf \frac{d^2 xf}{dt^2} = kr(z + Lf \cdot \theta - xf) + cf\left(\frac{dz}{dt} + Lf \cdot \frac{d\theta}{dt} - \frac{dxf}{dt}\right) + ktf \cdot xf \tag{4c}$$

$$mr \frac{d^2 xr}{dt^2} = kr(z - Lr \cdot \theta - xr) + cr\left(\frac{dz}{dt} - Lr \cdot \frac{d\theta}{dt} - \frac{dxr}{dt}\right) + ktr \cdot xr \tag{4d}$$

In Expressions (4a), (4b), (4c), (4d)), xf and xr are unsprung displacement amounts of the front wheels 6 and the rear wheels 7, and mf and mr are the unsprung mass of the front wheels 6 and the rear wheels 7. Expressions (4a) to (4b) constitute equation of states, as in Expression (2a), in the same way as in the case of FIG. 5, with z, θ, xf and xr, and the time differential value thereof, as a state variable vector (the matrix A has 8 rows and 8 columns and the matrix B has 8 rows and 1 column). The gain matrix K such that the magnitude of the state variable vector is caused to converge to 0 can be worked out according to the optimal regulator theory. Actual vibration damping control is herein identical to that of FIG. 5.

An explanation follows next on the calculation of a wheel torque estimated value. By providing respective torque sensors in the wheels 5i, the FB control system 51b of the compensation amount computation unit 51 of the vibration damping control unit 50 illustrated in FIG. 4 may be configured so as to actually detect wheel torque that is inputted as a disturbance. Herein there is used the wheel torque estimated value Tw, which is estimated in the wheel torque estimation unit 511 on the basis of a value another detectable value in the vehicle 1 during travel.

The wheel torque estimated value Tw can be estimated and calculated on the basis of Expression (5) below, using a time derivative of the wheel rotational speed $\omega$ or wheel speed value $r\cdot\omega$, obtained from respective wheel speed sensors 32*i* corresponding to the wheels 5*i*.

$$Tw = M \cdot r^2 \cdot d\omega/dt \quad (5)$$

In Expression (5), M is the mass of the vehicle and r is the wheel radius.

Specifically, the wheel torque estimated value Tw is given by Expression (5a) below, by assuming the sum of the driving forces generated at the site at which the drive wheels directly touch the road surface to be equal to the total driving force M·G (G is acceleration) of the vehicle 1:

$$Tw = M \cdot G \cdot r \quad (5a).$$

The acceleration G of the vehicle 1 is given by the differential value of the wheel speed $r\cdot\omega$, according to Expression (5b) below:

$$G = r \cdot d\omega/dt \quad (5b).$$

Therefore, the wheel torque is estimated as per Expression (5).

In the vibration damping control device 10 according to Embodiment 1, vibration damping control is performed by adding the vibration damping torque, calculated on the basis of the wheel speed, to the driver-required torque, as described above. However, such vibration damping control is performed only in a case where the control stop determination unit 53 determines that vibration damping control is to be performed, on the basis of the determination result by the NV worsening region determination unit 52. The methods resorted to in the above determinations are explained next.

Figure 7:
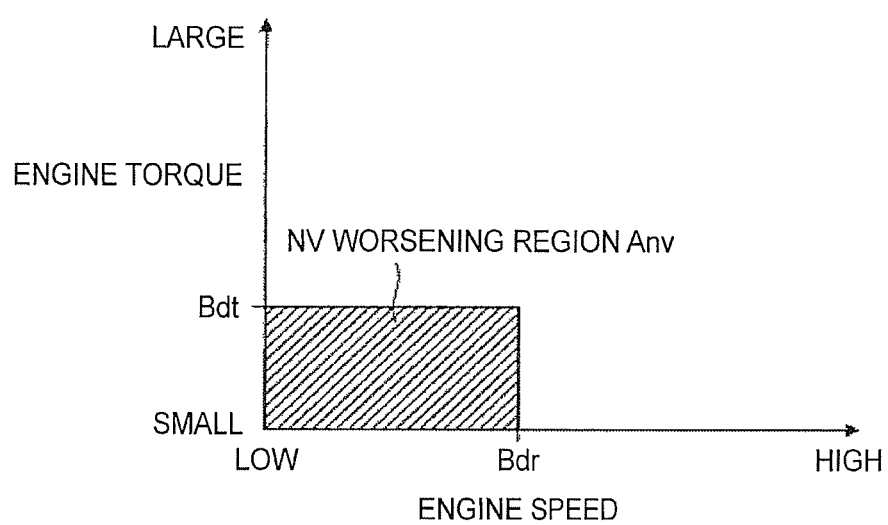
FIG. 7 is an explanatory diagram of an NV worsening region.

FIG. 7 is an explanatory diagram of an NV worsening region. Firstly, the NV worsening region determination unit 52 determines whether or not the travel state of the vehicle 1 is in an NV worsening region, on the basis of engine speed and engine torque. Specifically, the NV worsening region, which is a region at which noise and vibration increase during travel of the vehicle 1 is a characteristic that is based on the configuration of the configuration of the vehicle 1, and hence can be defined beforehand. Accordingly, the NV worsening region is defined by a region denoted by the engine speed and the engine torque. In the case, for instance, of a four-wheel drive vehicle, noise and vibration occur readily, on account of resonance with drive system components, at a region where engine speed are low and engine torque is small. Therefore, the NV worsening region is defined by a region at which engine speed are low and engine torque small. Therefore, a region at which engine speed are equal to or lower than reference speed Bdr and the engine torque is equal to or smaller than a reference torque Bdt, is defined as an NV worsening region Any, in the vehicle 1 provided with the vibration damping control device 10 according to Embodiment 1. The NV worsening region Any thus defined is stored beforehand in storage unit of the electronic control device 40.

To determine whether or not the travel state of the vehicle 1 is in the NV worsening region, the NV worsening region determination unit 52 compares the engine speed and the engine torque acquired on the basis of, for instance, signals from the engine speed sensor 30, against the reference speed Bdr and the reference torque Bdt. The current travel state of the vehicle 1 is determined to be in the NV worsening region Any if, as a result of this comparison, the acquired engine speed are equal to or lower than the reference speed Bdr, and the acquired engine torque is equal to or smaller than the reference torque Bdt.

The result of the determination of whether or not the travel state of the vehicle 1 is in the NV worsening region Any is transmitted to the control stop determination unit 53. The control stop determination unit 53 determines, on the basis of the result of the determination performed by the NV worsening region determination unit 52, whether or not vibration damping control is to be performed, and determines to stop vibration damping control in a case where the travel state of the vehicle 1 has been determined to be in the NV worsening region Any. That is, the control stop determination unit 53 is provided as a control determination unit that determines whether or not vibration damping control suppression control is to be performed, such that the vibration damping control unit 50 performs vibration damping control suppression control in a case where the control stop determination unit 53 determines to stop vibration damping control.

If it is determined that the travel state of the vehicle 1 is not in the NV worsening region Any, by contrast, it is determined that vibration damping control is to be executed. If the control stop determination unit 53 has determined that vibration damping control is to be executed, the vibration damping control unit 50 transmits, to the driving control unit 45, the vibration damping torque that is the torque compensation amount that is calculated in the compensation amount computation unit 51, and adds the vibration damping torque to the driver-required torque, to perform vibration damping control thereby.

Figure 8:
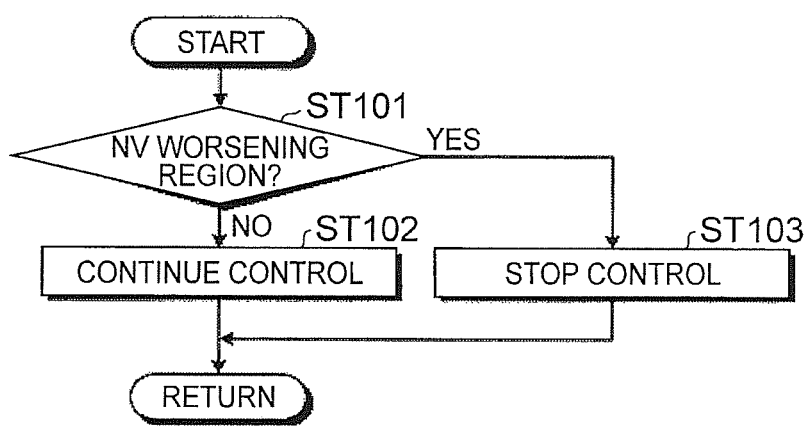
FIG. 8 is a flow diagram illustrating an outline of a processing procedure in the vibration damping control device according to Embodiment 1.

FIG. 8 is a flow diagram illustrating an outline of the processing procedure in the vibration damping control device according to Embodiment 1. An outline of the control method of the vibration damping control device 10 according to Embodiment 1, namely of the processing procedure in the vibration damping control device 10, will be explained next. The process below is a processing procedure of an instance of determining whether or not to stop vibration damping control, and is called up and executed every predefined period, upon control of the various units during running of the vehicle 1. In the processing procedure in the vibration damping control device 10 according to Embodiment 1, a determination of being or not an NV worsening region is performed first (step ST101). In this determination, the NV worsening region determination unit 52 of the vibration damping control unit 50 determines whether or not the current travel state of the vehicle 1 is in the NV worsening region, according to the engine speed and the engine torque that are acquired on the basis of, for instance, the detection result by the engine speed sensor 30.

Control is continued if, as a result of this determination, it is determined that the travel state of the vehicle 1 is not in the NV worsening region (No in step ST101) (step ST102). Specifically, if the NV worsening region determination unit 52 determines that the travel state of the vehicle 1 is not in the NV worsening region, the control stop determination unit 53 does not stop vibration damping control, and the vibration damping torque calculated by the compensation amount computation unit 51 is transmitted to the driving control unit 45, to continue vibration damping control thereby.

If, by contrast, it is determined that the travel state of the vehicle 1 is in the NV worsening region (Yes in step ST101), control is stopped (step ST103). Specifically, if the NV worsening region determination unit 52 determines that the travel state of the vehicle 1 is in the NV worsening region, the control stop determination unit 53 determines to stop vibration damping control, and there is stopped transmission, to the driving control unit 45, of the vibration damping torque calculated by the compensation amount computation unit 51, to stop vibration damping control thereby.

Upon execution of vibration damping control of suppressing sprung vibration, the vibration damping control device 10 according to Embodiment 1 performs vibration damping control suppression control on the basis of engine speed and engine torque during travel of the vehicle 1. Accordingly, vibration damping control is not performed in a case where the travel state of the vehicle 1 is a state of increasing noise and vibration. Therefore, it becomes possible to prevent vibration damping control from becoming inappropriate through addition of an inappropriate vibration damping torque, derived from a travel state of substantial vibration during vibration damping control, to the driver-required torque. As a result, vibration damping control can be properly performed in the vehicle 1 where vibration occurs due to operating characteristics.

Further, the control stop determination unit 53 determines that vibration damping control suppression control is to be performed in a case where the NV worsening region determination unit 52 determines that the travel state of the vehicle 1 is in the NV worsening region, on the basis of the engine speed and the engine torque. Therefore, it becomes possible to stop vibration damping control, more reliably, in the case of a travel state of substantial vibration. In numerous instances, noise and vibration during travel of the vehicle 1 increase on account of resonance from drive system components, and hence noise and vibration increase readily in a case where the operating state of the engine 14 is a predefined operating state denoted by the engine speed and the engine torque. Accordingly, the NV worsening region is set, on the basis of the engine speed and the engine torque, as the travel state at which noise and vibration increase, and vibration damping control is stopped in a case where the travel state of the vehicle 1 is in the NV worsening region, whereby it becomes possible to suppress, more reliably, vibration damping control in cases of travel state of substantial vibration. As a result, it becomes possible to suppress execution of inappropriate vibration damping control, and to perform vibration damping control more properly in the vehicle 1 in which vibration occurs due to operating characteristics.

During vibration damping control, whether or not to stop vibration damping control and perform vibration damping control suppression control is determined on the basis of whether or not the operating state of the vehicle 1 is in the NV worsening region as denoted by the engine speed and the engine torque. Accordingly, it becomes possible to perform easily yet more appropriate vibration damping control. That is, the engine speed and the engine torque can be acquired on the basis of the detection result of, for instance, the engine speed sensor 30 and the airflow sensor, that are ordinarily provided in the vehicle 1, and vibration damping control suppression control is performed on the basis of the operating state of the vehicle 1 thus acquired. Accordingly, it becomes possible to determine, without providing a new device in the vehicle 1, whether or not the travel state is a travel state that allows performing appropriate vibration damping control, and vibration damping control can be performed on the basis of this determination. As a result, this allows curtailing increases in production costs that are incurred upon more proper execution of vibration damping control.

[Embodiment 2]

The characterizing feature of a vibration damping control device 60 according to Embodiment 2, which has a configuration substantially identical to that of the vibration damping control device 10 according to Embodiment 1, is that vibration damping control suppression control is performed by reducing the control amount in sprung vibration damping control. Other features are identical to those of Embodiment 1. Hence, a recurrent explanation thereof will be omitted, and the features will be denoted with the same reference numerals.

Figure 9:
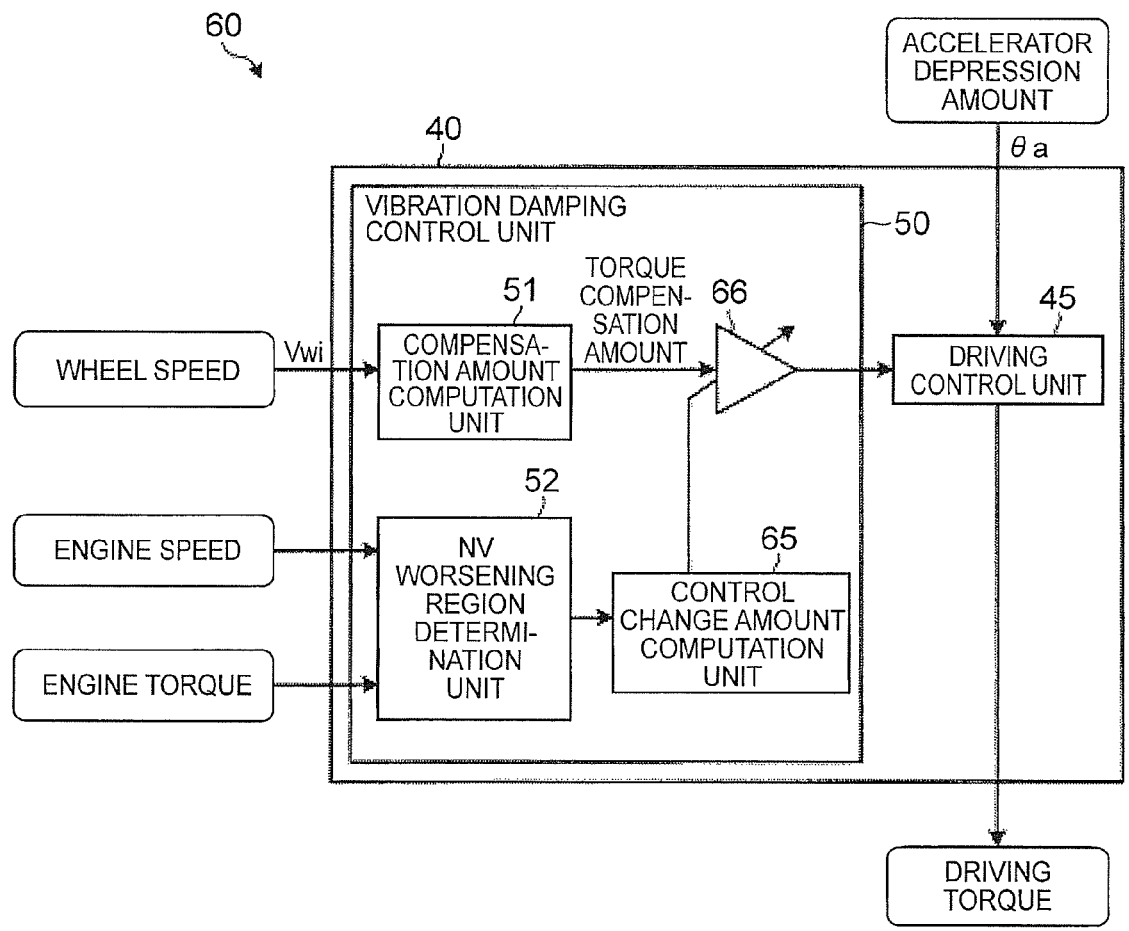
FIG. 9 is a configuration schematic diagram of an electronic control device of a vibration damping control device according to Embodiment 2.

FIG. 9 is a configuration schematic diagram of an electronic control device of a vibration damping control device according to Embodiment 2. The vibration damping control device 60 according to Embodiment 2 has the electronic control device 40 identical to that of the vibration damping control device 10 according to Embodiment 1. The electronic control device 40 has the driving control unit 45 and the vibration damping control unit 50. The vibration damping control unit 50 has the compensation amount computation unit 51 and the NV worsening region determination unit 52 identical to those of the vibration damping control unit 50 in the vibration damping control device 10 according to Embodiment 1. The vibration damping control device 60 is provided with a control change amount computation unit 65 and a control amount modification unit 66 instead of the control stop determination unit 53.

Among the foregoing, the control change amount computation unit 65 computes a change amount of vibration damping control in a case where the NV worsening region determination unit 52 determines that the travel state of the vehicle 1 is in the NV worsening region. The control amount modification unit 66 modifies the compensation amount of driving torque calculated by the compensation amount computation unit 51, on the basis of the change amount of vibration damping control calculated by the control change amount computation unit 65. As a result, in a case where the NV worsening region determination unit 52 determines that the travel state of the vehicle 1 is in the NV worsening region, the compensation amount upon correction of the driver-required torque during vibration damping control is modified according to the change amount calculated by the control change amount computation unit 65, and the driving torque is corrected according to the compensation amount after modification.

Figure 10:
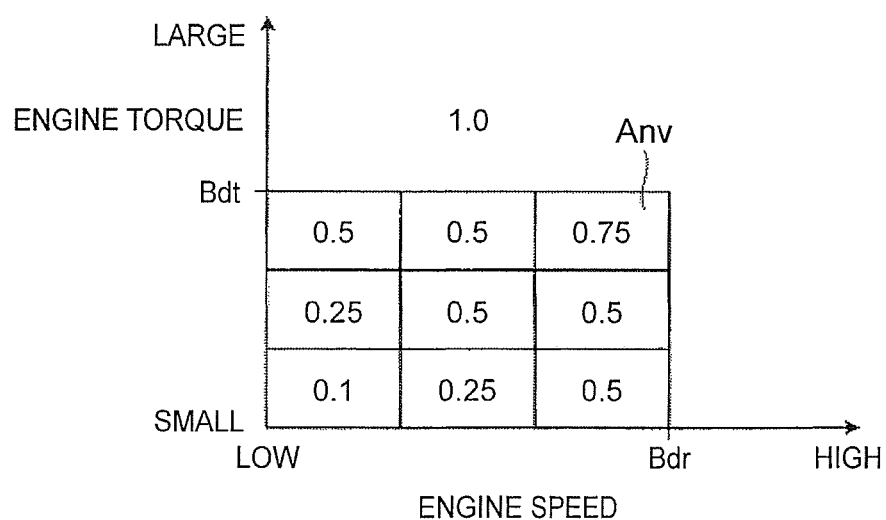
FIG. 10 is an explanatory diagram of an instance of computation of a change amount of vibration damping control.

FIG. 10 is an explanatory diagram of an instance of computation of a change amount of vibration damping control. An explanation follow's next on an example of a procedure for computing a change amount of vibration damping control by the control change amount computation unit 65. Herein, a gain is set on the basis of a relationship between engine speed and engine torque, and this gain is used as the change amount of vibration damping control. Specifically, the gain of the NV worsening region Any is set to a value smaller than 1, and this gain is set to decrease as the engine speed become lower than the reference speed Bdr, and to decrease as the engine torque becomes smaller than the reference torque Bdt, as illustrated in FIG. 10. The gain thus set is stored beforehand, in the form of a map, in the storage unit of the electronic control device 40. FIG. 10 illustrates an example of gain setting, and hence the magnitude of numerical values as well as the setting method thereof may be other than those illustrated in FIG. 10.

In a case where the NV worsening region determination unit 52 determines that the travel state of the vehicle 1 is in the NV worsening region, the gain map stored in the storage unit of the electronic control device 40 is referred to by using the engine speed and the engine torque acquired on the basis of the detection results of the engine speed sensor 30 and the accelerator depression amount sensor 36, upon computation of the change amount of vibration damping control by the control change amount computation unit 65. As a result, the control change amount computation unit 65 acquires a gain in accordance with the current engine speed and engine torque, and transmits the acquired gain to the control amount modification unit 66.

The control amount modification unit 66 multiplies the compensation amount of driving torque, calculated by the compensation amount computation unit 51, by the gain that is transmitted by the control change amount computation unit 65, to modify thereby the compensation amount of driving torque. Herein, the gain is a value smaller than 1, and hence the compensation amount of driving torque is modified to a value that is smaller than the compensation amount calculated by the compensation amount computation unit 51.

In a case where the NV worsening region determination unit 52 determines that the travel state of the vehicle 1 is in the NV worsening region, the vibration damping control unit 50 transmits to the driving control unit 45, by way of the control change amount computation unit 65 and the control amount modification unit 66, a compensation amount of driving torque having a value smaller than that of the compensation amount calculated by the compensation amount computation unit 51.

As a result, the driving control unit 45 corrects the driver-required torque on the basis of the compensation amount of driving torque of value smaller than that of the compensation amount calculated by the compensation amount computation unit 51, and determines the driving torque to be generated at the wheels 5. Therefore, the driving control unit 45 corrects the driver-required torque regardless of the travel state of the vehicle 1, and if the travel state of the vehicle 1 is in the NV worsening region, corrects the driver-required torque by reducing the compensation amount of driving torque, to perform thereby vibration damping control through reduction of a control amount. That is, vibration damping control suppression control is performed in the vibration damping control device 60 according to Embodiment 2 through reduction of the control amount of sprung vibration damping control.

Figure 11:
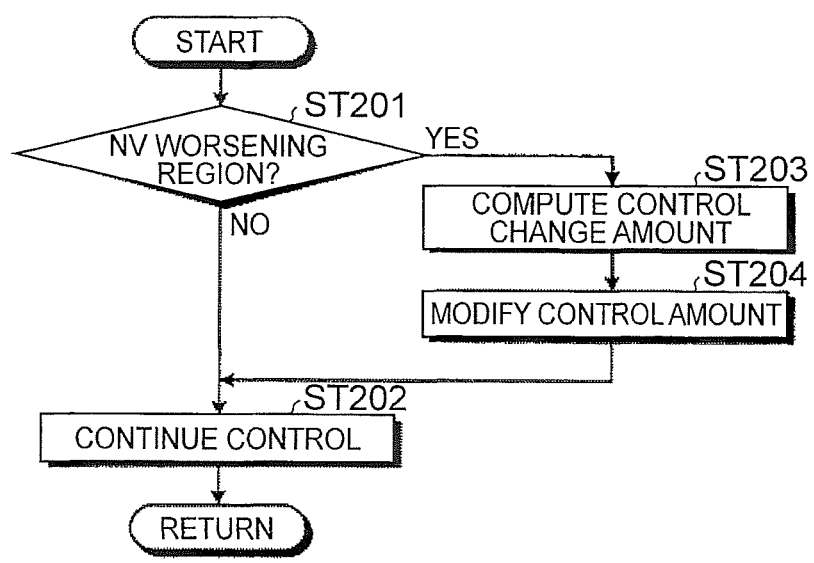
FIG. 11 is a flow diagram illustrating an outline of a processing procedure in the vibration damping control device according to Embodiment 2.

FIG. 11 is a flow diagram illustrating an outline of the processing procedure in the vibration damping control device according to Embodiment 2. An outline of the processing procedure in the vibration damping control device 60 according to Embodiment 2 will be explained next. In the processing procedure in the vibration damping control device 10 according to Embodiment 2, firstly the NV worsening region determination unit 52 determines whether an operating region is an NV worsening region or not (step ST201). If as a result of this determination it is determined that the travel state of the vehicle 1 is not in the NV worsening region (No in step ST201), the vibration damping torque calculated by the compensation amount computation unit 51 is transmitted to the driving control unit 45, to continue vibration damping control thereby (step ST202).

By contrast, if it is determined that the travel state of the vehicle 1 is in the NV worsening region (Yes in step ST201), a control change amount is computed (step ST203). That is, if the NV worsening region determination unit 52 determines that the travel state of the vehicle 1 is in the NV worsening region, a gain is derived in the control change amount computation unit 65 on the basis of the engine speed and the engine torque, to compute thereby the change amount of vibration damping control.

Next, the control amount is modified (step ST204). Specifically, the compensation amount of driving torque calculated by the compensation amount computation unit 51 is modified on the basis of the change amount of vibration damping control calculated by the control change amount computation unit 65, to modify thereby the control amount upon execution of vibration damping control. Once the control amount of vibration damping control is thus modified, the compensation amount of driving torque after modification, i.e. the vibration damping torque, is transmitted to the driving control unit 45, to continue vibration damping control thereby (step ST202). Accordingly, vibration damping control is continued, through modification of the control amount, in a case where the travel state of the vehicle 1 is determined to be in the NV worsening region.

In the vibration damping control device 60 according to Embodiment 2 above, the control amount upon execution of vibration damping control is reduced in a case where the travel state of the vehicle 1 is a state of increasing noise and vibration. As a result, it becomes possible to prevent that the vibration damping torque, which is added to the driver-required torque, should take on an inappropriate magnitude, due to a travel state of large vibration, during vibration damping control. In consequence, vibration damping control can be performed properly in the vehicle 1 in which vibration occurs due to operating characteristics.

Further, the NV worsening region is set such that the control amount of sprung vibration damping control is reduced on the basis of a determination result on whether or not the travel state of the vehicle 1 is in the NV worsening region. Accordingly, it becomes possible to suppress, more reliably, execution of vibration damping control according to a vibration damping torque of inappropriate magnitude, in the case of a travel state of substantial vibration. As a result, this allows suppressing execution of inappropriate vibration damping control, and allows performing vibration damping control more properly in the vehicle 1 where vibration occurs due to operating characteristics.

Further, vibration damping control is continued, while the control amount is being reduced, also in a case where the travel state of the vehicle 1 is in the NV worsening region. Therefore, it becomes possible to curtail sprung vibration also in the case of a travel state of increasing noise and vibration, and to secure ride comfort and steering stability, regardless of the travel state of the vehicle 1. Accordingly, it becomes possible to perform vibration damping control more properly in the vehicle 1 where vibration occurs due to operating characteristics.

As a method for computing the change amount of vibration damping control, gain according to the operating state of the engine 14 is set beforehand, and a compensation amount of driving torque is modified using this gain; as a result, it becomes possible to reduce, reliably and easily, the control amount of vibration damping control in a case where the travel state of the vehicle 1 is in the NV worsening region. In consequence, it becomes possible to easily perform vibration damping control more properly, regardless of the travel state of the vehicle 1.

The method for computing a change amount of vibration damping control in the vibration damping control device 60 according to Embodiment 2 involves using a gain that is set in accordance with the operating state of the engine 14, but the computation of the change amount of vibration damping control may be accomplished utilizing parameters other than gain.

Figure 12:
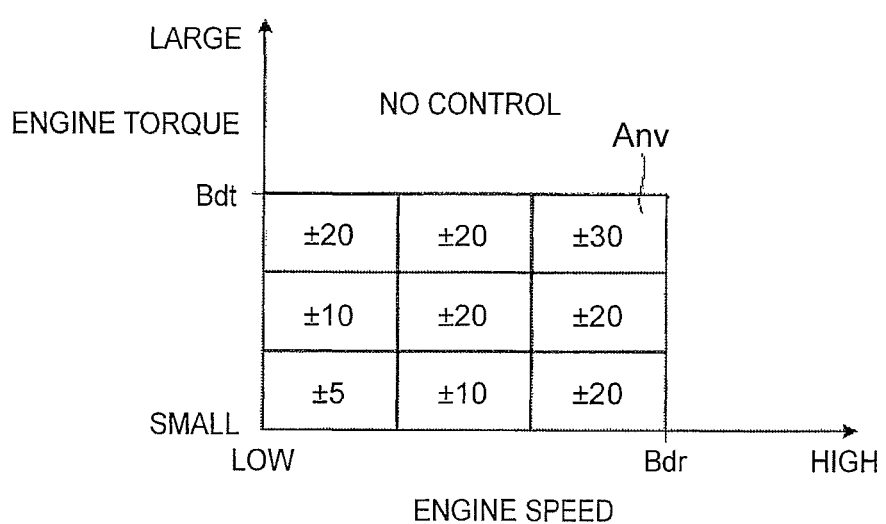
FIG. 12 is an explanatory diagram of a variation of the vibration damping control device according to Embodiment 2.

FIG. 12 is an explanatory diagram of a variation of the vibration damping control device according to Embodiment 2. Herein, the change amount of vibration damping control involves, for instance, setting a limit value of the control amount according to a relationship between engine speed and engine torque, such that the limit value may be used as the change amount of vibration damping control. Specifically, a limit value of the correction amount at the time of correction of the driving torque through vibration damping control is set for the NV worsening region Any, and this limit value is set to decrease as the engine speed become lower than the reference speed Bdr, and to decrease as the engine torque becomes smaller than the reference torque Bdt, as illustrated in FIG. 12. That is, the maximum value of the correction amount of driving torque by vibration damping control is reduced, and the upper-limit value upon modification of the driving torque by vibration damping control is reduced, as the engine speed become lower or the engine torque becomes smaller, in a case where the travel state of the vehicle 1 is in the NV worsening region. The limit value thus set is stored beforehand, in the form of a map, in the storage unit of the electronic control device 40. In FIG. 12, an example of setting of the limit value is depicted wherein the limit value upon correction of the driving torque is a numerical value the units whereof are Nm, but the magnitude of numerical values as well as the setting method thereof may be other than those illustrated in FIG. 12.

When the limit value of the control amount of the vibration damping control is set in a case where the NV worsening region determination unit 52 determines that the travel state of the vehicle 1 is in the NV worsening region, a limit value map stored in the storage unit of the electronic control device 40 is referred to by using the engine speed and the engine torque acquired on the basis of, for example, the detection result of the engine speed sensor 30, upon computation of the change amount of vibration damping control by the control change amount computation unit 65. As a result, the control change amount computation unit 65 acquires a limit value in accordance with the current engine speed and engine torque, and transmits the acquired limit value to the control amount modification unit 66.

The control amount modification unit 66 compares the limit value transmitted by the control change amount computation unit 65 with the compensation amount of driving torque calculated by the compensation amount computation unit 51, such that if the calculated compensation amount is smaller than the limit value, the calculated compensation amount is used as the control amount of vibration damping control. On the other hand, the limit value transmitted by the control change amount computation unit 65 is used as the control amount of vibration damping control if the calculated compensation amount is equal to or higher than the limit value.

In a case where the NV worsening region determination unit 52 determines that the travel state of the vehicle 1 is in the NV worsening region, the vibration damping control unit 50 limits the magnitude of the compensation amount calculated by the compensation amount computation unit 51, and transmits to the driving control unit 45, by way of the control change amount computation unit 65 and the control amount modification unit 66, the compensation amount of driving torque that lies within the limited range. As a result, the driving control unit 45 corrects the driver-required torque on the basis of the compensation amount of driving torque the magnitude whereof has been limited, and determines the driving torque to be generated in the wheels 5.

Therefore, the driving control unit 45 corrects the driver-required torque regardless of the travel state of the vehicle 1, and if the travel state of the vehicle 1 is in the NV worsening region, corrects the driver-required torque by limiting the magnitude of the compensation amount of driving torque, to perform thereby vibration damping control through reduction of the control amount. As a result, it becomes possible to prevent yet more reliably that the compensation amount of driving torque should become inappropriate and to suppress improper vibration damping control, in cases of a travel state of increasing noise and vibration.

In the vehicle 1 having the vibration damping control devices 10 and 60 according to Embodiments 1 and 2, noise and vibration increase if engine speed are comparatively low. In the vibration damping control devices 10 and 60, an operating region of small engine torque is set as the NV worsening region, at low engine speed, but the NV worsening region may be a region other than such an operating region. The operating region at which noise and vibration increase varies depending on the configuration and characteristics of the vehicle 1, and hence the NV worsening region is preferably set, as appropriate, in accordance with the characteristics of the vehicle 1.

The vehicle 1 having the vibration damping control devices 10 and 60 according to Embodiments 1 and 2 is provided in the form of a four-wheel drive vehicle that generates driving force both at the front wheels 6 and the rear wheels 7, but the drive scheme may be other than four-wheel drive, for instance front-wheel drive or rear-wheel drive. A power source other than the engine 14 may be used in the vehicle 1. The vehicle 1 provided with the vibration damping control devices 10 and 60 may be, for instance, a so-called hybrid vehicle that runs by using concomitantly power generated by the engine 14 and power generated by an electric motor. Sprung vibration occurs regardless of the type of drive in the vehicle 1, and hence the configuration of the driving device 12 of the vehicle 1 that is provided with the vibration damping control devices 10 and 60 has no bearing on the above-described features.

In the vibration damping control device 60 according to Embodiment 2, computation of the change amount of vibration damping control is performed in the control change amount computation unit 65, in a case where the NV worsening region determination unit 52 determines that the travel state of the vehicle 1 is in the NV worsening region. However, the change amount of vibration damping control may be computed without any determination of whether or not the travel state of the vehicle 1 is in the NV worsening region. That is, the control change amount computation unit 65 determines a gain in accordance with engine speed and engine torque, and determines a limit value of control amount. Therefore, the gain of vibration damping control and the limit value of the control amount may be determined for any travel state, without any determination of whether or not the operating region is the NV worsening region or not. As a result, it is possible to omit determination of whether the travel state of the vehicle 1 is in the NV worsening region or not, and hence the configuration of the electronic control device 40 can be simplified, and the process of vibration damping control can be likewise streamlined.

The electronic control device 40 that performs the above-described control may be configured in the form of an electronic control device other than the electronic control device 40 of the vibration damping control devices 10 and 60 according to Embodiments 1 and 2. Herein it suffices that the electronic control device 40 is provided with various functions for carrying out the above-described control. So long as these various functions are present, the configuration of the electronic control device 40 may differ from the above-described configurations. By having these functions, the electronic control device 40 can stop vibration damping control, and can reduce the control amount of vibration damping control, in a case where the travel state of the vehicle 1 is in a state of increasing noise and vibration. Vibration damping control can be performed yet more properly as a result.

In the vibration damping control devices 10 and 60 according to Embodiments 1 and 2, instances have been explained wherein control of the driving torque is performed on the basis of a driver-required torque, but the invention is not limited thereto. For instance, the vehicle 1 may be provided with an automatic travel control device such as adaptive cruise control (ACC), and power control may be performed on the basis of a required torque that is calculated in a case where the various units of the vehicle driving device 3 are controlled according to automatic travel control.

Description of Reference Numerals

- 1 vehicle
- 3 vehicle driving device
- 5 wheel
- 10, 60 vibration damping control device
- 12 driving device
- 14 engine
- 16 automatic transmission
- 30 engine speed sensor
- 32 wheel speed sensor
- 35 accelerator pedal
- 36 accelerator depression amount sensor
- 40 electronic control device
- 45 driving control unit
- 50 vibration damping control unit
- 51 compensation amount computation unit
- 52 NV worsening region determination unit
- 53 control stop determination unit
- 65 control change amount computation unit
- 66 control amount modification unit

The invention claimed is:

1. A vibration damping control device for a vehicle having an internal combustion engine as a power source, said vibration damping control device comprising:
    an electronic control device configured to execute:
    sprung vibration damping control that suppresses sprung vibration generated in the vehicle, by control of torque generated in wheels of the vehicle; and
    vibration damping control suppression control that reduces a control amount of the sprung vibration damping control, the vibration damping control suppression control is performed on the basis of engine speed and engine torque of the internal combustion engine that is the power source of the vehicle during travel, the control amount of the sprung vibration damping control is decreased when the engine speed becomes lower than a present reference speed and the control amount of the sprung vibration damping control is decreased when the engine torque becomes smaller than a preset reference torque.

2. The vibration damping control device according to claim 1, wherein the electronic control device is further configured to execute:
    determination of whether or not to perform the vibration damping control suppression control;
    determination, on the basis of the engine speed and the engine torque, whether or not a travel state of the vehicle is in an NV worsening region, which is a region at which vibration in the vehicle increases; and
    determination that the vibration damping control suppression control is to be performed when it is determined that the travel state of the vehicle is in the NV worsening region,
    wherein the vibration damping control suppression control, a gain is set based on the relationship between the engine speed and the engine torque, the gain of the NV worsening region is set to a value smaller than one, and the gain is used as the change amount of the sprung vibration damping control.

3. A vibration damping control device for a vehicle having an internal combustion engine as a power source, said vibration damping control device comprising:
    an electronic control device configured to execute:
    sprung vibration damping control that suppresses sprung vibration generated in the vehicle, by control of torque generated in wheels of the vehicle,
    determination of whether or not the travel state of the vehicle is in an NV worsening region, which is a region at which vibration in the vehicle increases, on the basis of an operating state of the internal combustion engine that is a power source of the vehicle during travel, and
    vibration damping control suppression control that reduces a control amount of the sprung vibration damping control is performed on the basis of the result of the determination on whether or not the travel state of the vehicle is in the NV worsening region,
    wherein the vibration damping control suppression control, a gain is set based on a relationship between an engine speed, a preset engine speed, an engine torque, and a preset engine torque, the gain of the NV worsening region is set to a value smaller than one, and the gain is used as the change amount of the sprung vibration damping control.

* * * * *